United States Patent [19]
Desrus et al.

[11] Patent Number: 5,512,807
[45] Date of Patent: Apr. 30, 1996

[54] ELECTRONIC CONTROL DEVICE FOR A DIRECT CURRENT ELECTRIC MOTOR HAVING TWO SUPPLY TERMINALS FOR A DRIVE SYSTEM OPERATING IN BACK-AND-FORTH MODE, AND THE APPLICATION OF SUCH A DEVICE TO A VEHICLE SCREEN WIPING SYSTEM

[75] Inventors: Dany Desrus, Fresnes; Jean-Luc Robino-Rizet, Massy, both of France; Hervé Couetoux, Auburn Hills, Mich.

[73] Assignee: Valeo Electronique, Creteil Cedex, France

[21] Appl. No.: 342,111

[22] Filed: Nov. 18, 1994

[30] Foreign Application Priority Data

Nov. 19, 1993 [FR] France ................................. 93 13830

[51] Int. Cl.⁶ ................................................. H02P 1/40
[52] U.S. Cl. ........................... 318/283; 318/285; 318/257
[58] Field of Search ................................. 318/283, 280, 318/284, 285, 287, 291, 293, 256, 257, 373, 362

[56] References Cited

U.S. PATENT DOCUMENTS

| | | | |
|---|---|---|---|
| 4,412,158 | 10/1983 | Jefferson et al. | 318/284 |
| 4,581,565 | 4/1986 | Van Pelt et al. | 318/294 |
| 4,980,838 | 12/1990 | Daggett et al. | 318/599 |

FOREIGN PATENT DOCUMENTS

| | | |
|---|---|---|
| 0034822 | 9/1981 | European Pat. Off. . |
| 58-170654 | 10/1983 | Japan . |
| 59-092235 | 5/1984 | Japan . |
| 60-056655 | 4/1985 | Japan . |
| 61-247541 | 11/1986 | Japan . |
| 4224442 | 8/1992 | Japan . |

*Primary Examiner*—John W. Cabeca
*Attorney, Agent, or Firm*—Morgan & Finnegan

[57] ABSTRACT

A drive motor for a motor vehicle screen wiping apparatus operates with repeated reversals of its direction of rotation, and is controlled by a control circuit which is connected to a transistor arranged in the power supply path for the motor, in series with it. The transistor is put into conduction at a time, and in a manner, such as to reduce the audible noise caused by the repeated reversals.

5 Claims, 4 Drawing Sheets

5,512,807

ELECTRONIC CONTROL DEVICE FOR A DIRECT CURRENT ELECTRIC MOTOR HAVING TWO SUPPLY TERMINALS FOR A DRIVE SYSTEM OPERATING IN BACK-AND-FORTH MODE, AND THE APPLICATION OF SUCH A DEVICE TO A VEHICLE SCREEN WIPING SYSTEM

FIELD OF THE INVENTION

The present invention relates to an electronic control system for a direct current electric motor, in particular where such a motor is arranged as a drive motor operating in back-and-forth alternating mode, in which its direction of rotation is repeatedly reversed. Such a motor is for instance used in a screen wiping system for a vehicle, for driving a screen wiper or wipers in oscillating motion.

BACKGROUND OF THE INVENTION

In conventional vehicle screen wiping systems, the drive motor gives rise to a substantial amount of audible noise at each reversal of direction during the wiping movement. In this connection, in the current state of the art, it is known to control the motion of a screen wiper arm in back-and-forth motion so as to sweep over a glass of the vehicle, such as the windshield. However, during the change of direction of the oscillation, also referred to as wiper reversal, a loud noise is generated, due in particular to the fact that mechanical clearances become reversed, and due also to the fact that the regime in which the motor is operating changes from a nominal speed in a first direction to a nominal speed in another direction. Noise is then generated due to the various accelerations involved.

As the general level of comfort in vehicles is improved, reversal noise in the screen wiper apparatus, occurring at the same time as various other noises, is no longer drowned by those other noises, since these have themselves been reduced.

DISCUSSION OF THE INVENTION

An object of the present invention is to provide a system in which audible reversal noise is reduced.

In this connection, the present invention is directed to an electronic control system for a direct current electric motor having two supply terminals, especially where such a motor forms part of a screen wiper system or other apparatus in which the motor drives in a mode involving repeated reversals.

According to the invention, the electronic control device comprises:

detecting means for detecting a command for reversal of the direction of rotation of the motor, a control circuit which receives the detection signal and produces a control signal in response thereto, a controlled interrupter connected between one or other of the two supply terminals of the electric motor and one power supply polarity, and having a control electrode which receives the control signal, with the control signal opening the controlled interrupter and then restoring its conduction only slowly.

The invention also provides a drive system, such as that of a screen wiping apparatus for a vehicle, having such a control device.

These and other features and advantages of the present invention will be understood more clearly on a reading of the detailed description of a preferred embodiment of the invention, which follows by way of example only and with reference to the accompanying drawings.

DESCRIPTION OF PREFERRED EMBODIMENTS OF THE INVENTION

Figure 1:
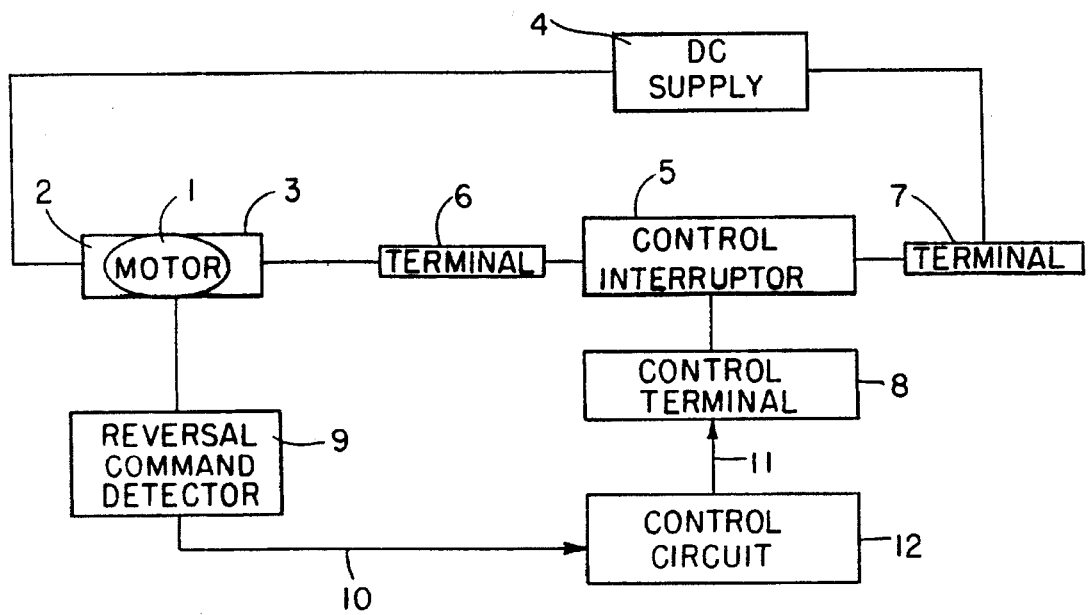
FIG. 1 is a simplified block diagram of one preferred embodiment of the invention.

Reference is first made to FIG. 1 showing a simplified block diagram of a preferred embodiment of the invention. The electric motor 1 has two brushes which are connected electrically to a direct current supply network through terminals 2 and 3. The d.c. electrical supply is produced by a source 4 which, according to the position of the drive system which is not shown in the drawings, applies an inversion to the polarity applied to the terminals of the motor. The source 4 is connected firstly to the terminal 2 of the motor and secondly to a terminal 7 of a circuit which consists principally of a controllable interrupter 5. The other terminal 6 of the controllable interrupter 5 is connected to the free terminal 3 of the electric motor 1.

The drive system also includes a means 9 for detecting a command for reversal of the direction of rotation of the motor. This means 9 may comprise two end-of-travel sensors arranged on either side of the extreme end points of the oscillating travel of the drive system in its to-and-fro motion. The detection signals are transmitted through an input 10 to a control circuit 12 which thus receives the detection signal and produces a control signal in response to it. The control system from the control device 12 is passed through a line 11 to the control terminal 8 of the controllable interruptor 5.

Figure 2:
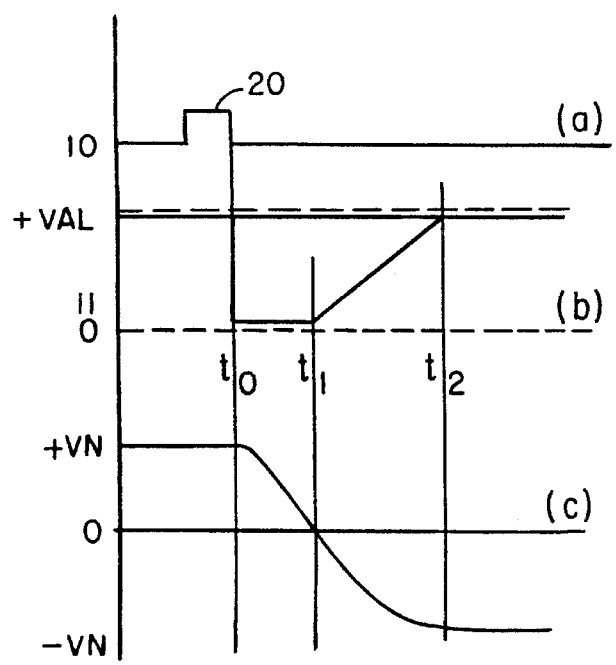
FIG. 2 is a diagram showing three time-based characteristics of the operation of the arrangement shown in FIG. 1.

The operation of the electronic control device will now be described with reference to FIG. 2. In FIG. 2(a), at the instant $t_0$, the detecting means 9, for detecting a command for reversal of the direction of rotation of the motor 1, produces a pulse 20 which informs the electronic control device that the direction of motor rotation is to be reversed. The peak or pulse 20 in FIG. 2(a) serves both to activate the control device 12 via the input line 10, and to set the d.c. supply source 4 in the opposite polarity when that becomes necessary, as will be seen later in this document.

The control circuit 12 produces a control signal 11 (represented in FIG. 2(b)) which enables the controllable interruptor 5 to open at the instant $t_0$. FIG. 2(b) shows the time characteristic of the control signal 11 from the controllable interrupter 5. At the instant $t_0$, the voltage across the terminals of the motor, which was equal $t_0 + V_s$ representing the supply voltage, falls to the value 0 due to opening of the interrupter 5. From the instant $t_0$ to the instant $t_1$, the voltage remains at zero, after which the control device produces a control signal 11 in the form of an ascending ramp, which is such as to restore the voltage to the value $+V_s$ at the instant $t_2$. In this way, the motor is able to perform in an optimised manner by simultaneously regulating the period in which the voltage is zero, i.e. to the instant $t_1$, and the slope of the ramp, that is to say the period $t_2-t_1$, in such a way as to optimise the behaviour of the back-and-forth drive system, especially as regards audible noise emitted at each reversal.

In particular, the inventors have found that this "reversal noise" in a screen wiping system is due mainly to the phase of re-acceleration of the motion after deceleration, and that the deceleration phase makes it necessary only to reduce the voltage to zero, rather than to provide an additional, dependent, control system which is more complicated to make.

On the other hand, in order to reduce the noise due to restarting, it is necessary to limit the power which is received by the motor during the restarting phase, in such a way as to bring it to its maximum value slowly, by the use of gentle commutation. Therefore, using this system, the velocity of rotation of the motor is reversed at the instant $t_1$, and it slowly restarts in the direction opposite to the initial direction, up to the nominal value $-VN$ of opposite sign with respect to the velocity $+VN$ as shown in FIG. 2(c). The nominal velocity ceases at the instant $t_0$, so as to be reversed and to regain the nominal numerical value of the velocity, in the opposite direction, at the instant $t_2$.

Figure 3:
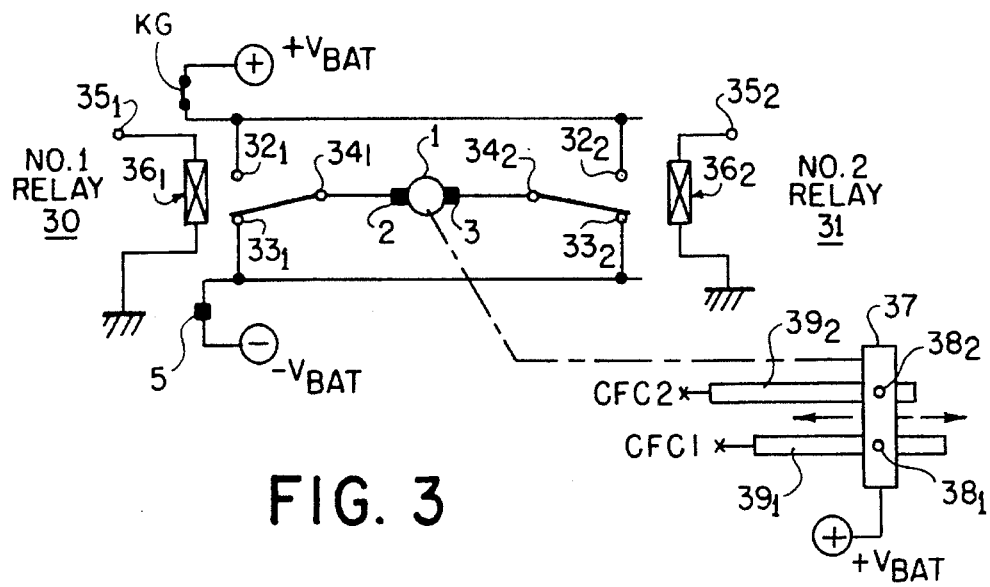
FIG. 3 is a block diagram for one circuit used in the system shown in FIG. 1.

Referring now to FIG. 3, this shows one preferred form of the d.c. supply circuit 4, which is arranged to produce reversal of the motion of the screen wiping system.

The circuit 4 conventionally comprises two electromagnetic relays 30 and 31, having two contacts and a movable finger. The relay 30 has a movable finger connected to a contact 34-1, which is itself connected to the terminal 2 of the motor 1, while the relay 31 has a movable finger connected to a terminal 34-2, the latter being connected to the terminal 3 of the motor 1. In addition, the terminals 32-1 and 32-2 of the relays 30 and 31 are connected to the positive supply voltage $+V_B$ through a continuously operating relay KG, while the terminals 33-1 and 33-2 are connected through the controlled interruptor 5 to the polarity $-V_B$ of the power supply source, such as a battery. Finally, the relays 30 and 31 have control terminals 35-1 and 35-2 respectively, which control electromagnetic contact-changing coils 36-1 and 36-2 of the relays. In particular the relays may be of the bi-stable type.

The motor 1 is connected mechanically to a pair of friction elements mounted on a support 37, which is a movable cursor 37 in this example. These friction elements are indicated at 38-1 and 38-2, and are both connected to a positive potential such as the positive potential $+V_B$ of the battery. Two tracks, 39-1 and 39-2 respectively, are arranged in the motor reversal detecting means 9. Two access terminals, CFC1 and CFC2 respectively, are engaged on the tracks 39-1 and 39-2 respectively. These access terminals are connected, optionally through a suitable control circuit, to the respective input terminals 35-1 and 35-2, so as to enable the direction of rotation of the motor to be reversed in response to the position reached by the movable cursor 37. The motion of the latter is linked to the motion of the screen wiping system in particular, or to any other operating system to which the control device may be applied.

In another embodiment, the motor is coupled mechanically to the tracks 39-1 and 39-1. The friction elements 38-1 and 38-2 are mounted on the support 37, which in this case is not a movable cursor but is fixed. The signals CFC1 and CFC2 are taken from the friction elements 38-1 and 38-2.

Figure 4:
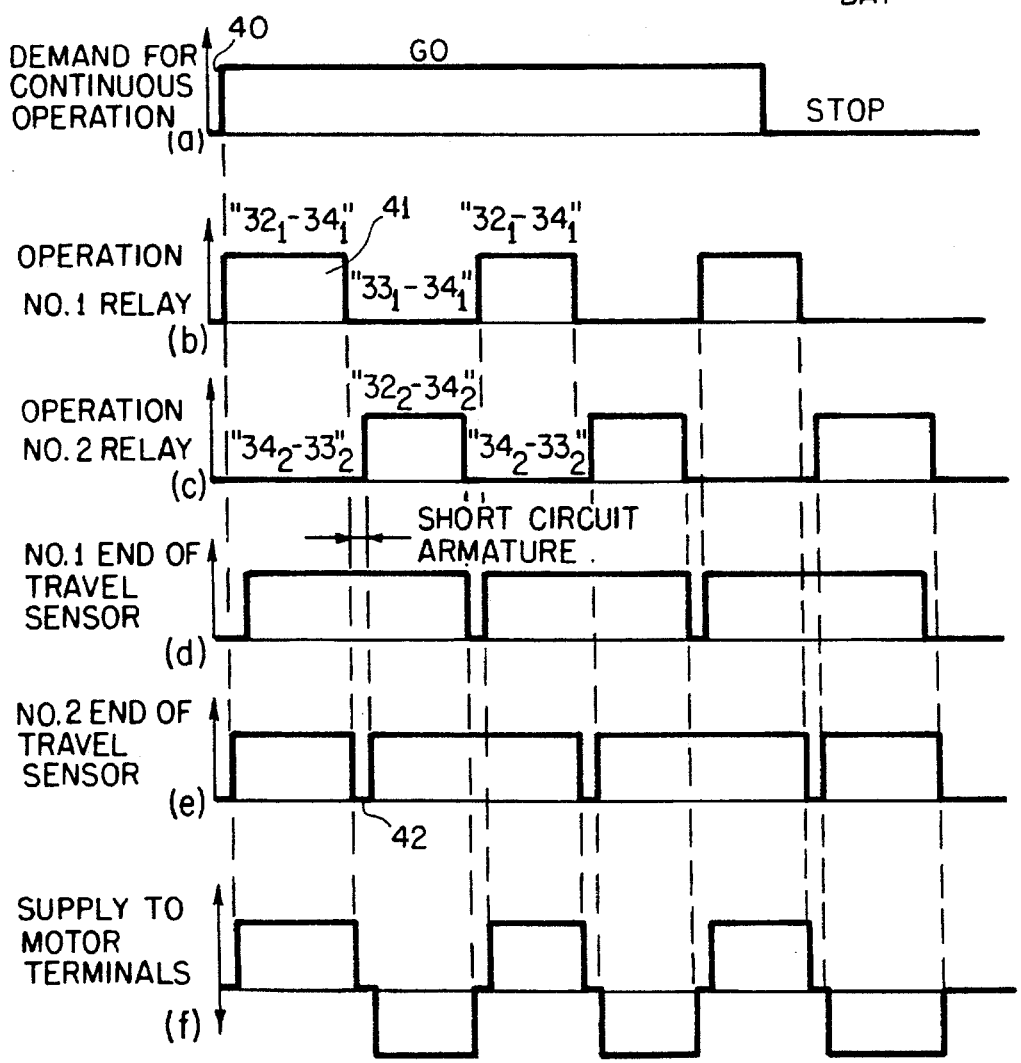
FIG. 4 comprises five time-based diagrams (a) to (f), showing the operation of the system shown in block diagram form in FIG. 1, when using the circuit shown in FIG. 3.

Reference is now made to FIG. 4, which shows six time-based control characteristics of the relays 30 and 31 in FIG. 3. FIG. 4(a) shows the continuous operation demand which is in the form of a pulse that prevails over the whole of the period of continuous operation of the actuating system. This pulse has a rising front 40 when the interruptor KG is closed by the user who requires the system to be started.

In this initial position, the No. 1 end-of-travel sensor, which consists of the track 39-1, is not connected to the potential $+V_B$, whereas in FIG. 4(e) it will be noticed that No. 2 end-of-travel sensor, i.e. the track 39-2, is connected to the potential $+V_B$, as can be seen in the right hand side of the diagram of FIG. 3, showing the end-of-travel detector 9 (FIG. 1).

Under these conditions, the No. 1 relay 30 goes to the position 32-1, which is represented by a pulse 41 in FIG. 4(b). Under these conditions the No. 2 relay (reference numeral 31 in FIG. 3) is in a state in which it is on contact 33-2. The current flows in the motor in a first direction, which drives the motor in a first direction of rotation. When the movable cursor 37 is displaced along the end-of-travel sensors, the output signals CFC1 and CFC2 remain at the voltage $V_B$, as is represented in the diagrams of FIGS. 4(d) and 4(e) respectively.

It will be noticed from FIG. 3 that when the first end of travel is reached, the friction element 38-2 arrives in a position in which it is not on the track 39-2, while the friction element 38-1 still remains on the track 39-1 connected to the potential $+V_B$. At the first end of travel, the time zone 42 in FIG. 4 corresponds to a short circuit of the motor, which gives rise to a braking action. The control or command circuit of the screen wiping system reconnects the contact 34-2 with the contact 32-2, which energises the motor in the opposite direction. Accordingly, as is indicated by the zone 42 in FIG. 4(e), the end-of-travel detection signal on the No. 2 end-of-travel sensor, i.e. at the output CFC2 of the latter, reverts to zero. Through the above mentioned relay control circuit, this reverses the direction of operation of the relay 31, which reverts to the state in which the contacts 32-2 and 34-2 are connected as indicated in FIG. 4(c). The No. 1 relay 30 then also switches to the position in which the contacts 33-1 and 34-1 are connected. In FIG. 4(b), this switching occurs before that which brings the contacts 32-2 into connection with 34-2. As a result, the positive battery voltage $+V_B$ is connected on the terminal 3 of the motor 1, and the current flows in the other direction, which drives the motor in a second direction of rotation. FIG. 4(f) shows the waveform of the supply voltage on the terminals of the motor 1. It will be noted that when the direction is reversed the voltage is zero, which causes the armature to be short circuited. It is during this time period, corresponding to the period 42 in FIG. 4(e) that "reversal noise" occurs; this is limited by the controlled interruptor 5 being brought into operation.

Figure 5:
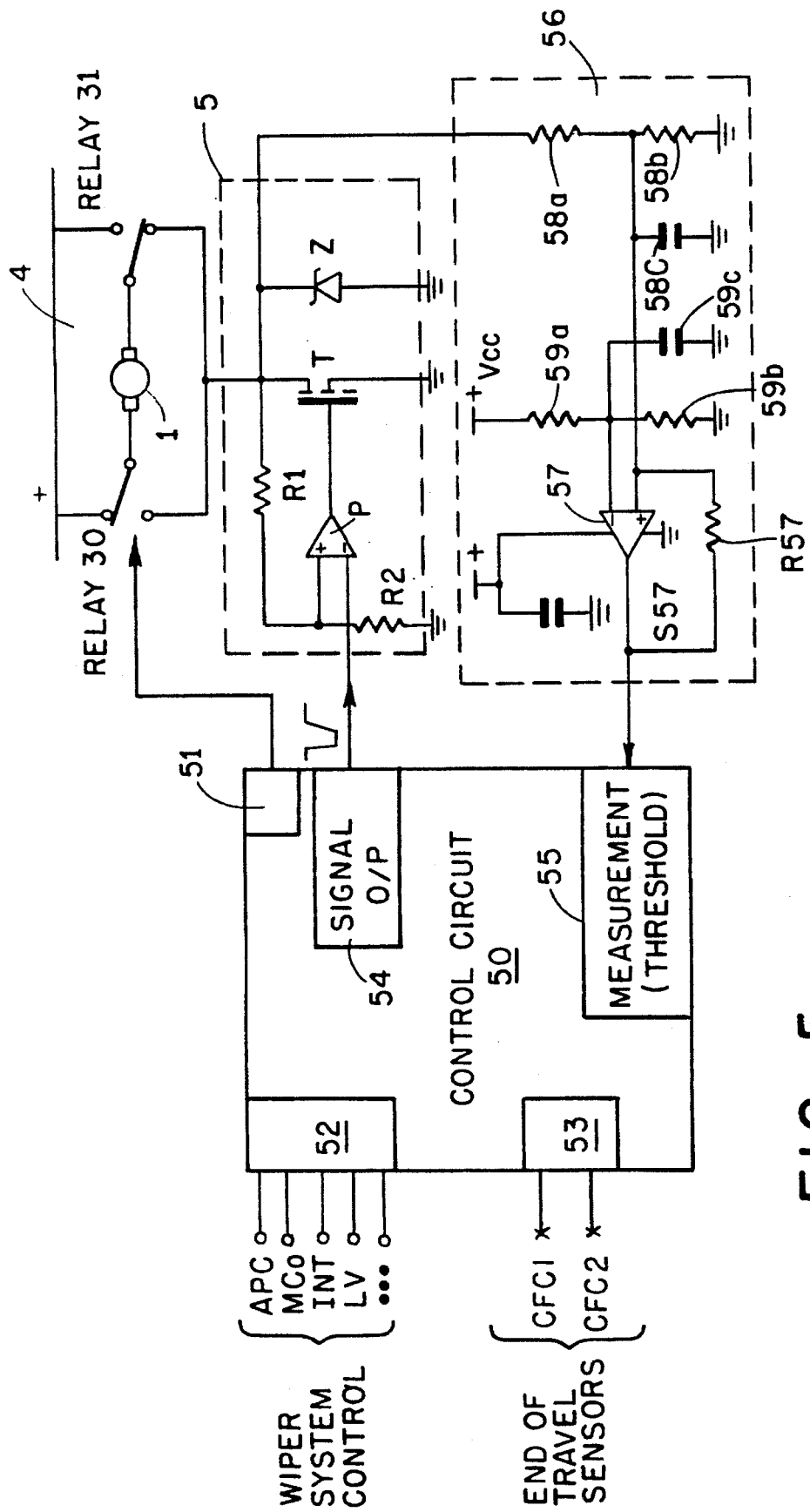
FIG. 5 is a circuit diagram, partly in block form, showing a preferred embodiment of the invention.

Reference is now made to FIG. 5, which shows diagrammatically one preferred embodiment of the invention. The circuit 4 for reversing the direction of rotation of the motor has been shown diagrammatically, and will not be described here any further.

The coils of the relays 30 and 31 (not shown in FIG. 5) are controlled by an output 51 of a control circuit 50, which consists in particular of a microcontroller or a specific integrated circuit. The microcontroller or control circuit 50 has a series of input ports 52 which, in particular, receive data $+APC$ relating to the starting of the vehicle; and control information supplied by the control unit of the screen wiping system, especially that which relates to the start of continuous operation (MCo), intermittent operation (INT) and screen washing (LV).

The control circuit 50 also has a set of input ports 53 which are connected so as to receive the end-of-travel signals CFC1 and CFC2 described above with reference to FIGS. 3 and 4.

The controllable interrupter 5 comprises mainly a field effect transistor T, the drain-source circuit of which is connected in parallel with a Zener diode Z. The drain of the transistor T is connected in common with the cathode of the Zener diode Z to the common low potential point of the supply circuit 4. The source of the transistor T and the anode of the Zener diode Z are connected to ground, that is to say to the negative polarity of the battery.

In addition, and in the known way, the transistor T is controlled through a circuit P, which consists of an operational amplifier connected through its positive input terminal, firstly to the drain of the transistor T through a resistor R1, and secondly to ground through a resistor R2. The negative terminal of the amplifier P is connected directly to a signal output port 54 of the control circuit 50. The output port 54 is so programmed as to generate the waveform shown in FIG. 2(b), in response to the detection of the ends of travel.

In one embodiment, the field effect transistor is of the MOS type, so as to limit the voltage drop and to facilitate control of the interrupter. In another embodiment, the transistor T is of the bipolar type.

In one embodiment, when the end-of-travel information CFC1 or CFC2 goes to the value 0, the control circuit 50 produces on the output port 54 a descending front which, through the control circuit P, causes the transistor T to open. The current in the motor is cancelled, and the motor passes into a freewheel mode of operation. Frictional effects in the operational system, for example the screen wiping system, reduce the speed of the motor until it stops. Since the transistor T is opened, the output port 51 of the control circuit 50 produces the control signals for the coils of the relays 30 and 31. Switching of the two relays can then be carried out freely while the transistor T is open, at an instant which is not critical, because the negative polarity is no longer accessible by the motor 1.

One advantage of the present invention is the limitation, thus provided, of the danger of premature or unwanted starting due to one of the terminals being put at a negative potential while the other terminal remains at positive potential.

The change of direction of motion by inversion of the control signal of the relays 30 and 31 can also be prepared for. When the relays are switched, which can be verified by testing the relays in a manner not shown in the drawings, control of the transistor T can be restored at leisure.

In a simplified first embodiment, restoration of control is obtained by means of a pre-programmed ramp, which is produced in the form of a table of values, which enables a digital-to-analogue converter, connected to the signal output port 54 of the control circuit 50, to generate a wave having a rising ramp waveform connected to the negative input terminal of the amplifier P of the controllable interrupter 5. In that case, switching takes place under control, and the voltage at the terminals of the transistor is applied to the positive input of the operational amplifier P. This control technique enables the voltage between drain and source to be reduced progressively in accordance with the determined ramp function. As a result, the tension at the motor terminals increases progressively, the effect of which is to control the acceleration of the motor without allowing it to race, due to the low impedances that are present in the motor supply line if sudden switching takes place. Accordingly, the acceleration of the motor is reduced, which reduces proportionately the forces exerted on restarting, and in particular thereby limits reversal noise. During this phase, in one preferred embodiment, the transistor T works in a linear mode.

In this simplified embodiment, the instant $t_1$ at which restarting takes place is preprogrammed, and selected to suit the system in which the control device is employed. Similarly, the instant $t_2$ at which full conduction starts is preprogrammed, and again depends on the system concerned and on its initial adjustments.

Such a solution is inexpensive for a system which does not undergo aging and which operates in a well-known way.

In the event that it is desired to have regard to aging of the controlled system, and also to the possibilities of variations in load, which may give rise to significant changes in the regulation of the system, it is arranged that a circuit 56 is added. This circuit 56 is shown in FIG. 5, and it enables the ramp for exciting conduction of the transistor T, produced from the signal output port 54, to be initiated once the voltage measured across the terminals of the transistor T exceeds a predetermined threshold value.

In the embodiment shown in FIG. 5, the circuit 56 for measuring the voltage at the source and drain terminals of the transistor T consists mainly of a comparator 57. A first positive input of the comparator 57 is connected through a dividing bridge 58a, 58b, to the source terminal of the transistor T. A filter capacitor 58c is provided. The negative input terminal of the amplifier 57 is connected to a voltage +Vcc through a second dividing bridge 59a, 59b. It may optionally also be provided with a filter capacitor 59c. The output terminal S57 of the amplifier 57, connected in voltage comparing mode by means of the feedback resistor R57, is connected to the input of an input port 55 of the control circuit 50, which produces a control signal (not shown) that enables the generation of the ramp signal for increasing conduction to be started, and controlled according to the instantaneous measured tension. In this embodiment the time of starting of the ramp signal depends on the circumstances.

Figure 6:
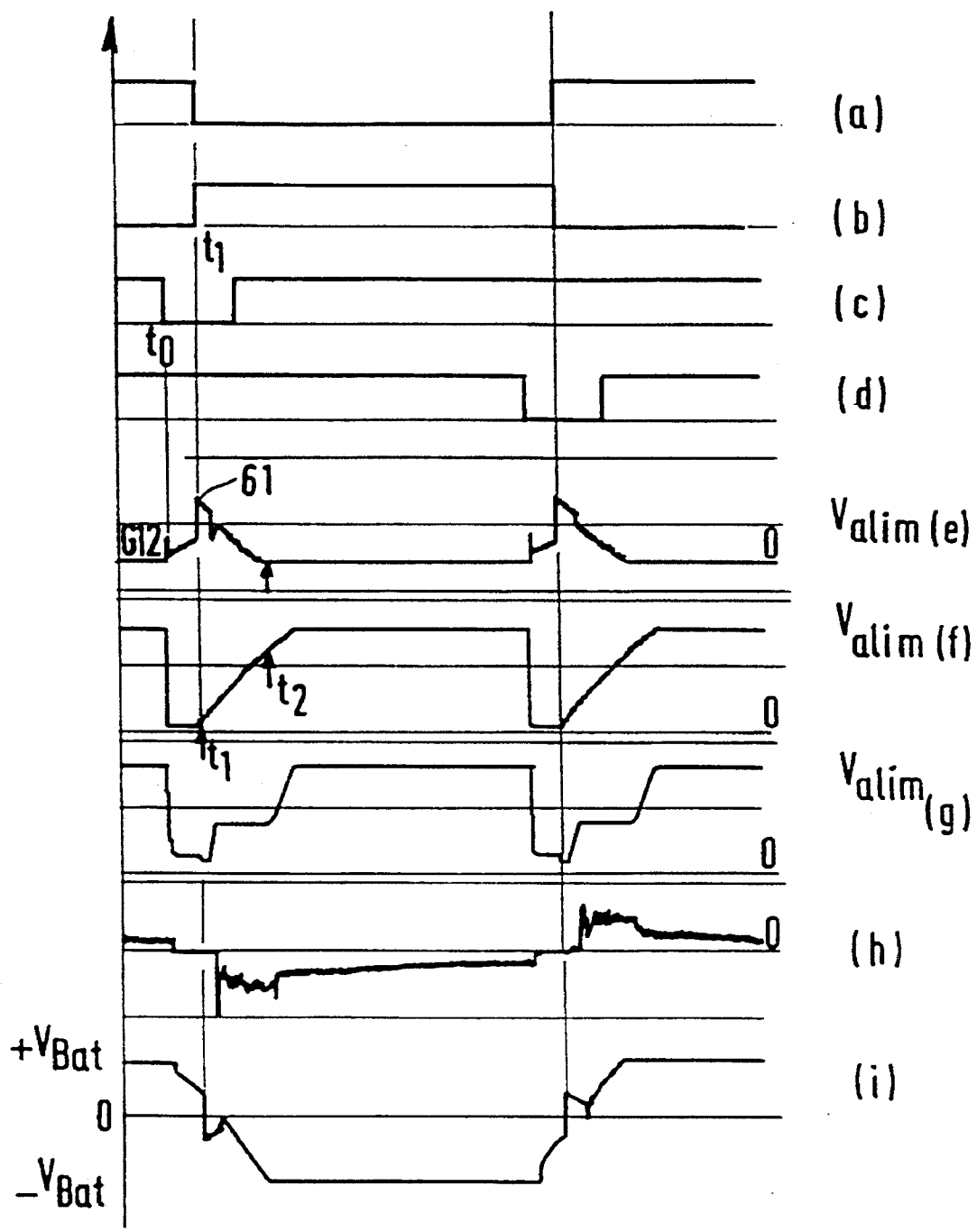
FIG. 6 consists of nine time-based characteristics, (a) to (i), for the operation of the circuit shown in FIG. 5.

Reference is now made to FIG. 6, which shows time diagrams measured on the system shown in FIG. 5. FIG. 6(a) shows the operation of the relay 30, while FIG. 6(b) shows the operation of the relay 31. It will be noted that the transition from an operating state takes place in opposed phase mode in the preferred embodiment. This phase transition takes place at the instant $t_1$ that follows the instant $t_0$ at which the end of travel signal CFC1 is detected (see FIG. 6(c)).

When the end of travel is detected, the gate voltage of the transistor T (see FIG. 6(g)) is reduced towards zero. The rapid switching operation causes a very slight switching peak 61 to occur on the drain-source voltage of the transistor T (see FIG. 6(e)).

When the control circuit produces the order to change the state of the relays 30 and 31 (FIGS. 6(a) and 6(b)), the voltage at the terminals of the motor is reversed about zero voltage. The output port 54 then produces at the instant $t_1$ a ramp signal for initiation of conduction, which persists at least until the instant $t_2$, at which the transistor T is fully conducting and is substantially at zero voltage. At that instant, the voltage at the terminals of the motor is reversed, and jumps substantially to $-V_B$.

Similarly, when the end-of-travel contact produces the signal CFC2 (see the descending pulse of FIG. 6(d)), a similar cycle is started, which need not be described any further here.

During experimental work, the inventors have found the following:

there is a great reduction in vibration and noise when the direction of travel of the drive system is changed;

it is possible to employ a simpler relay, having a single control coil for each of the relays 30 and 31, due to their simplified control in opposed phases;

the control loop and the measurement of voltage at the terminals of the transistor T, which serves as a controllable interrupter, can easily be incorporated into a specialised circuit such as an ASIC, with a function control processor, which, in the simplest version, limits the additional cost of operation to the single transistor.

Where the drive system described above, or otherwise in accordance with the invention, is applied to a screen wiping system, the inventors have found that the distance travelled by the wiper blades, during the phase in which the motor is not energised, displays a net variation which is a function of the frictional effects on the glass being swept, or a function of the supply voltage for the control system.

The frictional effects vary greatly according to the state of humidity and wetness of the surface of the glass, while the supply voltage of the control means depends for example on the battery voltage. It is well known that battery voltage in a motor vehicle can be subject to large variations.

In order to provide a remedy for this drawback in screen wiper applications, the inventors have employed, in the integrated circuit which constitutes the control circuit 50, a circuit for counting the time that elapses between the last two pieces of information delivered by the end-of-travel sensors. The time counted by the counter, and applied to the integrated circuit, is directly linked to the frictional effects and to the supply voltage.

The value of the time delay Te, measured using the above mentioned counter, enables a table of values of a time delay Tr to be addressed. This time delay Tr is added to the end-of-travel information CFC1 and CFC2 supplied by the end-of-travel sensors, in order to produce the signal for opening the transistors T and for initiating the change of direction by reversing the state of the relays. In general terms, if the time Te is short, then the time delay Tr which is introduced is nil; when the measured time Te increases, the delay Tr also increases. During this delay, the control of power supply to the motor remains at the maximum, and the motor can thus rotate through a greater angle than that which was traversed in the absence of any time delay.

In one experimental trial carried out using a vehicle, the wiping time varies between 0.8 and 2 seconds. In order to reduce the angular variation over a large number of sweeps of the screen wiper, to a value lying between + and −5 degrees of angle, it has been found that four values of time delay are enough, as follows:

| Te (seconds) | Time delay for the end-of-travel information Tr |
| --- | --- |
| <1 | 0 |
| 1 to 1.2 | 30ms |
| 1.2 to 1.4 | 60ms |
| Over 1.4 | 120ms |

The invention thus enables the whole of the problem to be resolved, and substantially improves the screen wiping function.

What is claimed is:

1. A direct current electric motor having two power supply terminals, in combination with an electronic control device for controlling the operation of the motor in alternate forward and reverse directions of rotation, the electronic control device comprising: detecting means for detecting a command for automatic reversal of the forward and reverse directions of motor rotation; at least one end of travel sensor for generating said command for automatic reversal of the forward and reverse directions of motor rotation; a control circuit connected to said detecting means for receiving output signals from said detecting means and for producing a control signal in response thereto; a direct current power supply means having at least one polarity; and a controlled interrupter having terminals connected between one of the supply terminals of the motor and said one power supply means polarity, the controlled interrupter having a control electrode connected to said control circuit for receiving the control signal from said control circuit for opening said controlled interrupter and then slowly reestablishing conduction of said interrupter, whereby to reduce noise caused by the reversal of the direction of rotation of the motor, said control circuit having a ramp generator for producing a signal of ramp waveform which puts said controlled interrupter slowly, and in a controlled manner, into full conduction in response to said command for reversal, wherein said ramp generator generates said ramp signal after the instant at which said interrupter opens.

2. A combination according to claim 1, wherein said ramp generator determines the instant at which said ramp is initiated, together with the waveform of said ramp in accordance with the voltage measured across said controlled interrupter terminals, the electronic control device further including a comparator circuit, and said control circuit including means connected to said comparator circuit for measuring comparator circuit output signals, whereby to measure the voltage across said controlled interrupter.

3. A combination according to claim 1, wherein said controlled interrupter is a field effect transistor of the MOS type.

4. A combination according to claim 1, wherein the electronic control device includes two relays connected on either side of the motor, each said relay having a terminal connected to a first polarity of said power supply means and a second terminal connected to a second polarity of said power supply means through said controlled interrupter, and further including means for applying said command for reversal of the direction of rotation of the motor to said two said relays.

5. Apparatus according to claim 1, wherein said control circuit further includes a screen wiper subject to frictional effects and variations in said power supply means regulated by said control circuit, a lapsed time counter for counting the time elapsed since the change of state of said at least one end-of-travel sensor, and a memory addressed as a function of said elapsed time, as measured by said time counter, to generate a time delay which begins at the instant of detection of the end of travel sensed by said at least one sensor, at the end of said time delay, to open said controlled interrupter and to stop the motor, whereby to enable the time delay to reduce angular variations in the screen wiping operation caused by frictional effects and variations in the voltage of said power supply means.

* * * * *